United States Patent [19]
Sorkin

[11] Patent Number: 5,474,335
[45] Date of Patent: Dec. 12, 1995

[54] DUCT COUPLER WITH HINGE INTERCONNECTED LOCKING RINGS

[76] Inventor: Felix L. Sorkin, General Technologies, Inc., 4115B Greenbriar Dr., P.O. Box 1503, Stafford, Tex. 77477

[21] Appl. No.: 291,755

[22] Filed: Aug. 17, 1994

[51] Int. Cl.⁶ ..................................... F16L 21/06
[52] U.S. Cl. ........................ 285/322; 285/369; 285/314; 285/309; 285/323
[58] Field of Search .................... 285/322, 323, 285/309, 314, 315, 310, 311, 313, 369

[56] References Cited

U.S. PATENT DOCUMENTS

| | | | |
|---|---|---|---|
| 2,784,987 | 3/1957 | Corcoran | 285/322 |
| 3,484,121 | 12/1969 | Quinton | 285/322 |
| 3,724,882 | 4/1973 | Dehar | 285/322 |
| 4,451,069 | 5/1984 | Melone | 285/325 |
| 5,029,904 | 7/1991 | Hunt | 285/314 |
| 5,171,045 | 12/1992 | Pasbrig | 285/322 |
| 5,338,071 | 8/1994 | Hohmann et al. | 285/322 |
| 5,366,259 | 11/1994 | Hohmann et al. | 285/323 |

FOREIGN PATENT DOCUMENTS

| | | | |
|---|---|---|---|
| 1016874 | 11/1952 | France | 285/222 |
| 966396 | 8/1957 | Germany | 285/322 |
| 448640 | 4/1968 | Switzerland | 285/322 |
| 372404 | 3/1973 | U.S.S.R. | 285/322 |
| 1724998 | 4/1992 | U.S.S.R. | 285/322 |

*Primary Examiner*—Eric K. Nicholson
*Attorney, Agent, or Firm*—Vinson & Elkins

[57] ABSTRACT

A duct coupler is disclosed for joining and sealing between adjacent sections of duct. The coupler includes a body, flexible cantilevered sections on the end of the body adapted to pass over annular protrusions on the duct and locking rings for locking the cantilevered flexible sections into position, so as to lock the coupler onto the duct.

10 Claims, 5 Drawing Sheets

DUCT COUPLER WITH HINGE INTERCONNECTED LOCKING RINGS

FIELD OF THE INVENTION

The present invention relates to a duct coupler, and more especially to a coupler for providing a water-tight joint between adjacent sections of duct used to provide a channel for multi-strand post-tensioning of concrete structures.

BACKGROUND OF THE INVENTION

For many years, the design of concrete structures imitated the typical steel design of column, girder and beam. With technological advances in structural concrete, however, its own form began to evolve. Concrete has the advantages of lower cost than steel, of not requiring fireproofing, and of its plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economic and popular. Reinforced-concrete framing is seemingly a quite simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, a mixture of water, cement, sand, and stone or aggregate, of proportions calculated to produce the required strength, is placed, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as one hundred feet can be attained in members as deep as three feet for roof loads. The basic principle is simple. In pre-stressing, reinforcing rods of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Prestressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts, or the like, are used to capture the cable at the anchor plate and, as the jack is removed from the tendon, to prevent its relaxation and hold it in its stressed condition.

Multi-strand tensioning is used when forming especially long post-tensioned concrete structures, or those which must carry especially heavy loads, such as elongated concrete beams for buildings, bridges, highway overpasses, etc. Multiple axially aligned strands of cable are used in order to achieve the required compressive forces for offsetting the anticipated loads. Special multi-strand anchors are utilized, with ports for the desired number of tensioning cables. Individual cables are then strung between the anchors, tensioned and locked as described above for the conventional monofilament post-tensioning system.

As with monofilament installations, it is highly desirable to protect the tensioned steel cables from corrosive elements, such as de-icing chemicals, sea water, brackish water, and even rain water which could enter through cracks or pores in the concrete and eventually cause corrosion and loss of tension of the cables. In multi-strand applications, the cables typically are protected against exposure to corrosive elements by surrounding them with a metal duct or, more recently, with a flexible duct made of an impermeable material, such as plastic. The protective duct extends between the anchors and in surrounding relationship to the bundle of tensioning cables. Flexible duct, which typically is provided in 20 to 40 foot sections is sealed at each end to an anchor and between adjacent sections of duct to provide a water-tight channel. Grout then may be pumped into the interior of the duct in surrounding relationship to the cables to provide further protection.

Several approaches have been tried to solve the problem of quickly, inexpensively and securely sealing the joints between adjacent sections of duct used in multi-strand post-tensioned applications. However, all prior art devices have utilized a plurality of arcuate sections which must be assembled at a joint around the ends of adjacent duct sections. Wedges, compression bolts or the like then are used to compress the joined sections into sealing engagement with the duct and with each other. Such prior art devices have been cumbersome to use and have proved somewhat unreliable in their ability to exclude moisture or other corrosive elements from the interior of the ducts.

It is, therefore, the primary object of the present invention to provide a coupler for sealing between adjacent sections of an elongated duct, especially of the type used in multi-strand post-tensioned construction of concrete structures.

Another object is to provide such an apparatus which requires no assembly by the user and which, when engaged with the opposed duct ends, will securely seal against intrusion of corrosive elements.

BRIEF DESCRIPTION OF THE DRAWINGS

These and other objects and advantages of the invention will become apparent from the following specification and from the accompanying drawings in which like numerals indicate like parts and in which.

DETAILED DESCRIPTION OF THE INVENTION

Figure 1:
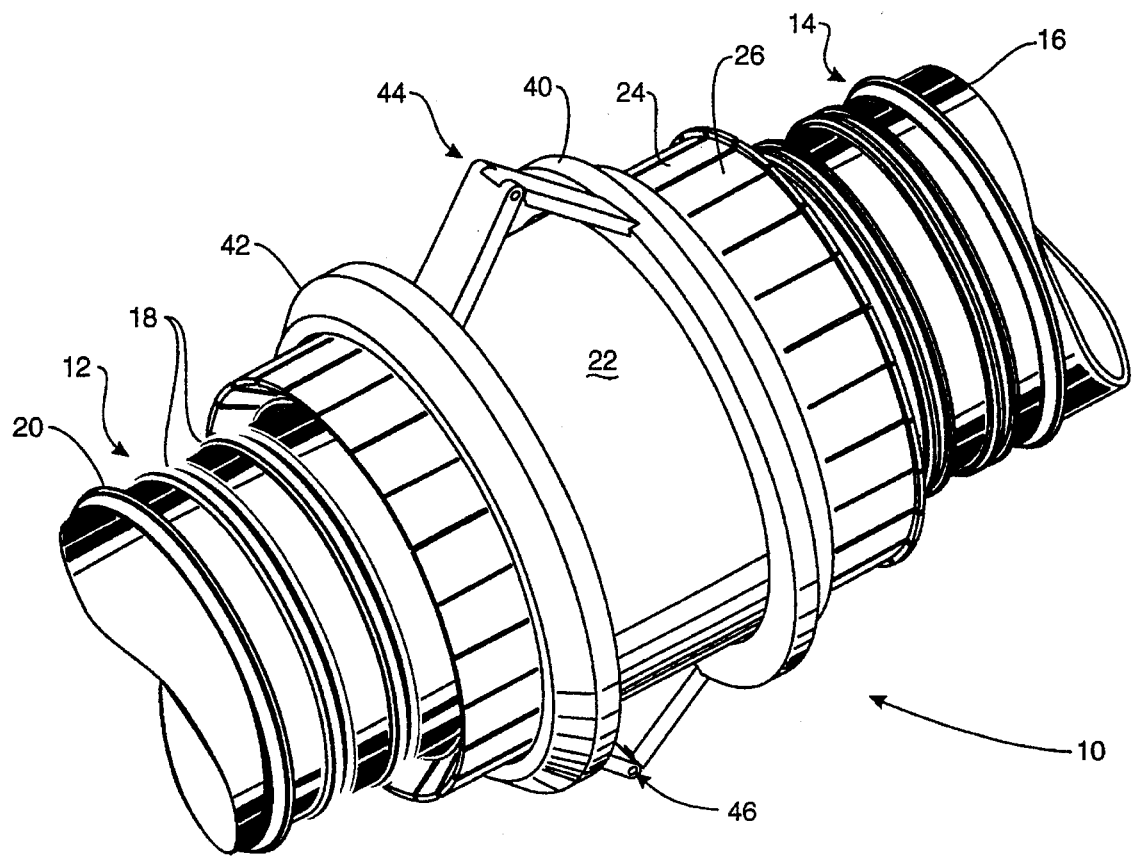
FIG. 1 is a perspective view of two sections of round prior art flexible duct joined by a coupler in accordance with the present invention.

Referring to FIG. 1, there is shown a duct coupler 10 in accordance with the present invention in surrounding relationship to the adjacent ends of two sections of flexible duct 12 and 14. Only portions of the ducts near their adjacent ends are shown; the entire sections of ducts may be 20 feet or more in length. Each section of duct comprises a cylindrical body 16, preferably formed of plastic or some other impermeable and relatively inert material. A plurality of increased diameter portions or protrusions extend above the outside diameter of the duct body 16. These comprise solid rectangular reinforcing ribs 18 and rounded annular ribs 20. Flexible duct in accordance with the design illustrated is available commercially, in a variety of lengths and diameters, from VSL, 2840 Plaza Place, Suite 200, Raleigh, N.C.

In surrounding relationship to the adjacent ends of the duct sections 12, 14 there is provided the duct coupler 10. It comprises a central cylindrical body 22, preferably formed of an impermeable, relatively inert and at least slightly flexible material, such as plastic, fiberglass or hard rubber. High density polyethylene or polypropylene would be suitable. A longitudinal passageway 23 extends through the coupler body and is dimensioned to accommodate the two ends of the duct sections 12, 14. Opposite longitudinal ends of the cylindrical body are provided with a plurality of longitudinally extending cuts or serrations 24 to provide a plurality of cantilevered segments or teeth 26. The shank portion, 28, of each tooth, since it is formed integrally with the coupler body 22, permits limited radial or outward flexibility of each tooth with respect to the longitudinal axis of the coupler 10 and ducts 12, 14. The teeth and shanks comprise flexible means for flexing outwardly to accommodate the passage of the annular ribs 20 therethrough and, when locked, for preventing longitudinal displacement of the duct sections. The end portion of each tooth, facing toward the duct sections 12, 14, is formed as an inclined surface 30, to provide biasing means for urging the individual teeth outwardly to permit them to pass over the ribs 18, 20 on the exterior surface of the ducts.

On the inside of the duct coupler body, proximate opposite ends of the longitudinal passageway 23, there are formed two channels or recesses 32 of increased inside diameter compared to the inside diameter of he adjacent portions of the passageway. Channels 32 have sloped inwardly facing sidewall portions 34, 36. The channels 32 are formed in the vicinity of the shank portions of the teeth 26. Each is dimensioned to accommodate the length of one annular rib 20 and a sealing element, with sufficient compression of the sealing element to seal between the coupler body and the duct. The sealing element preferably is an elastomeric o-ring 38 provided in surrounding relationship to the duct body 16.

On the outside of the duct coupler body there are provided a pair of longitudinally adjustable rings 40, 42 which comprise locking means for urging the radially outwardly flexed teeth 26 back toward the duct body and for preventing subsequent outward displacement of the teeth 26. The rings 40, 42 are slidable longitudinally of the coupler body 22 between engaged and disengaged positions. The two rings 40, 42 are joined by means for adjusting the locking means between disengaged and engaged portions. Such adjusting means preferably comprise two sets of hinges 44, 46 disposed on opposite sides of the coupler body. The hinges each comprise two hinge leafs 48 pivotally connected at their outer ends by hinge pins 50 to one of the locking rings and at their inner ends by hinge pins 52 to each other.

Figure 2:
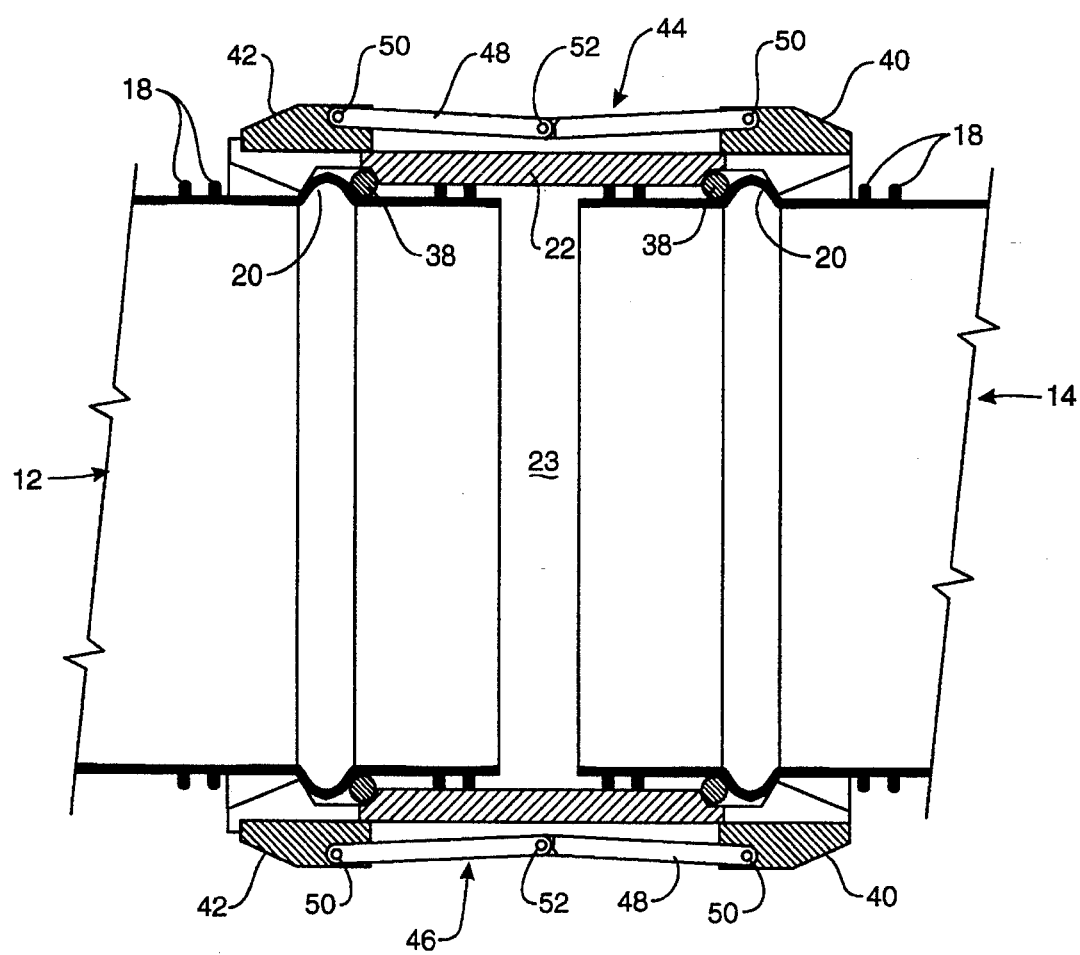
FIG. 2 is an elevational view, partly in section, of the duct sections and coupler of FIG. 1.

Means preferably are provided for retaining the locking means rings 40, 42 in the expanded, engaged, position where they will lock the individual teeth 26 into position. Such retaining means preferably are provided by constructing the hinges 44, 46 so that, when the rings are their extended, locking, position, the central portions of the hinges will be closer to the longitudinal axis of the duct coupler 10 than are the end portions of the hinges. This position of the hinges is shown in FIG. 2. When so positioned, any movement of the locking rings 40, 42 toward each other will tend to further depress the hines, until they contact the body 22 of the duct coupler, preventing further movement. The rings may be released simply by manually lifting the hinges at their centers to permit the hinges to open in the normal manner.

Although not shown, the duct coupler 10 also may include a port or other means suitable for injecting grout into the interior of the coupler and adjacent duct sections.

In using the duct coupler in accordance with the present invention, the hinges 44, 46 are raised so that the locking rings 40, 42 slide toward each other along the body 22 of the duct coupler. The duct coupler is then engaged around the outside of the adjacent ends of duct sections 12, 14. The sealing means, o-ring sealing elements 38, may be placed around the outside of the duct sections prior to engaging the coupler, or may be carried in the duct coupler channels 32. The coupler and duct sections are moved longitudinally toward each other until the teeth 26 have passed over one of the annular ribs 20 on each duct section. The hinges 44, 46 are then compressed to move the rings 40, 42 longitudinally outwardly and to compress the teeth sections 26. As they are compressed against the outside surface of the annular ribs 20, the teeth will cause the ribs to move into a compressive, sealing engagement with the o-rings 38 and, simultaneously, will prevent disengagement of the ducts from the coupler. A shoulder 27 formed on at least some of the teeth 26 provides a stop for the locking ring 40. Continued inward movement of the hinges until the central hinge pins 52 are depressed below pins 50 will lock the rings 40, 42 into a fully expanded position. The coupler then is fully assembled and ready for insertion of grout either through a port in the coupler, or through ports in the duct sections or anchor plates.

Figure 3:
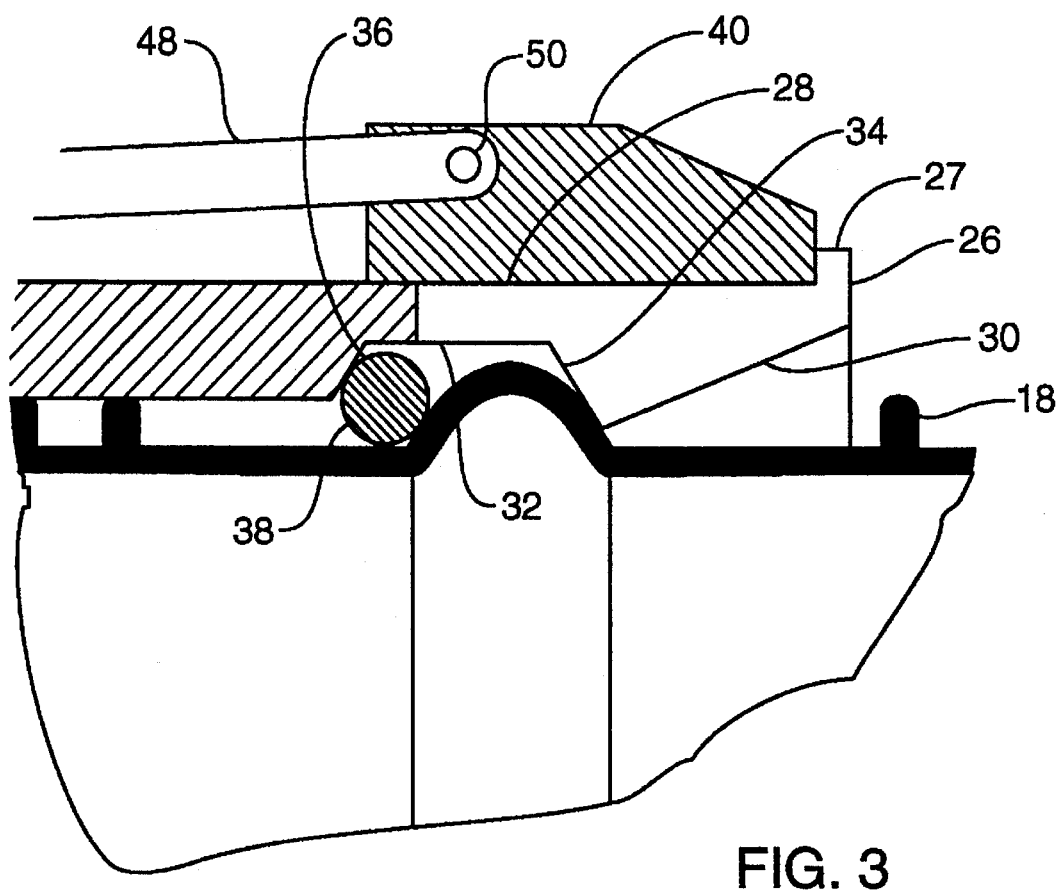
FIG. 3 is an enlarged detail view, partly in section, illustrating the latch and sealing means of the duct coupler.
Figure 4:
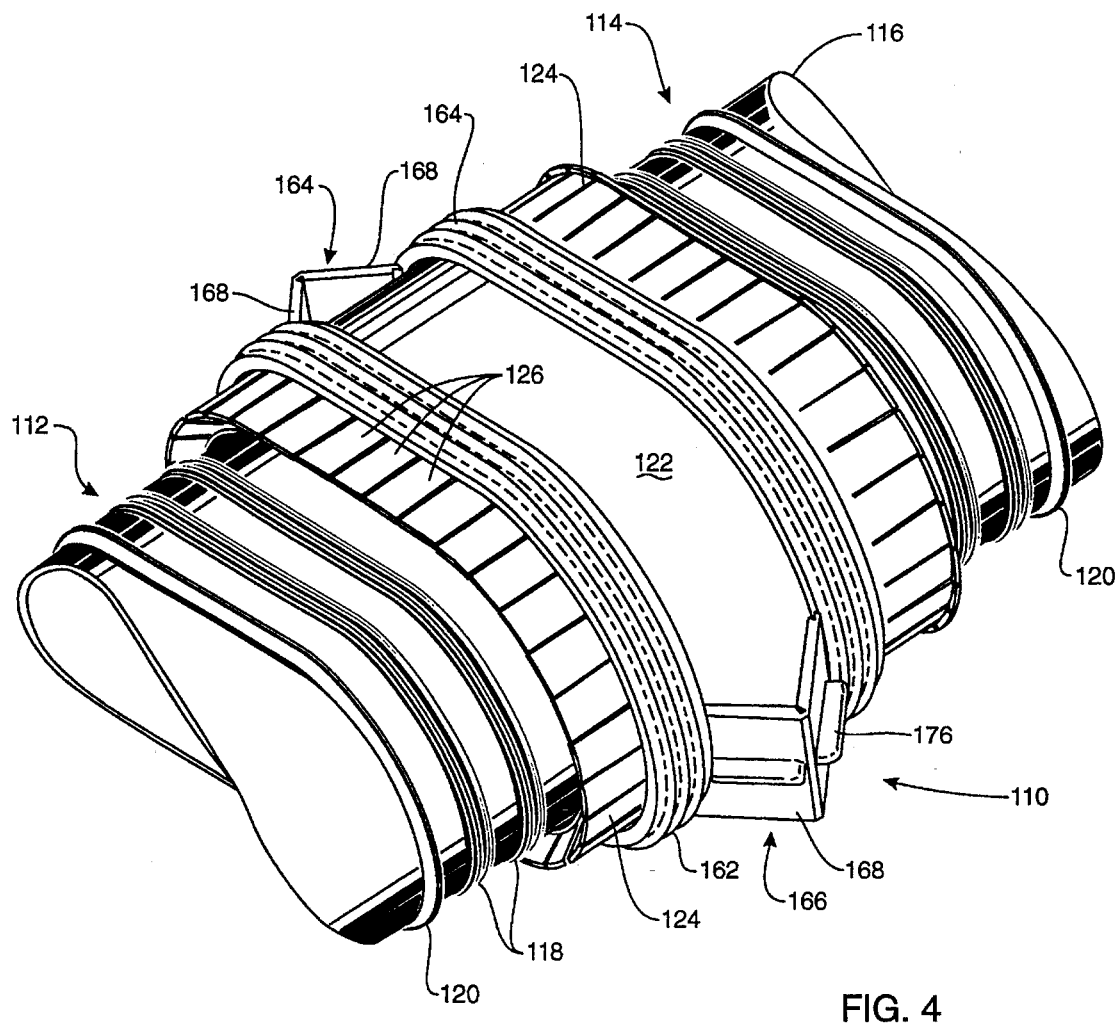
FIG. 4 is a perspective view of two sections of oval prior art flexible duct joined by an alternate embodiment of the coupler in accordance with the present invention.
Figure 5B:
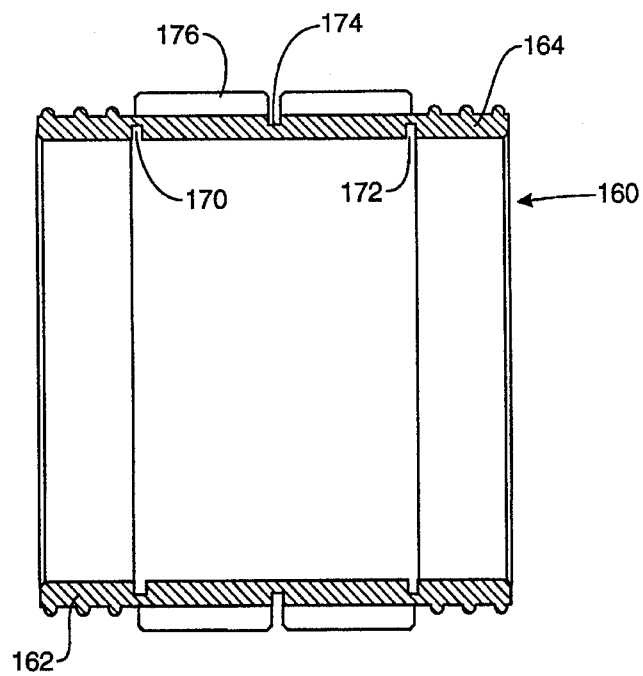
FIGS. 5A, 5B and 5C are, respectively, an end elevational view, a side elevational view partly in section and a top view partly in section of the locking apparatus used with the coupler of FIG. 4.
Figure 5A:
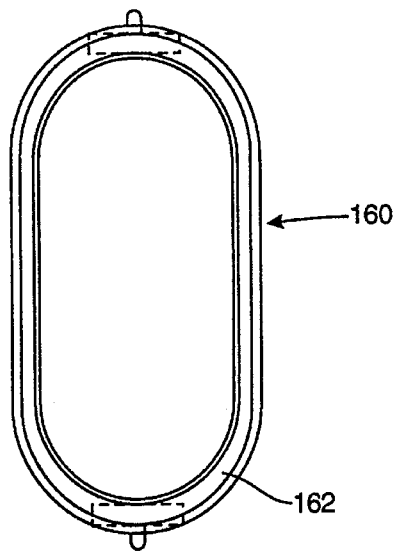
Figure 5C:
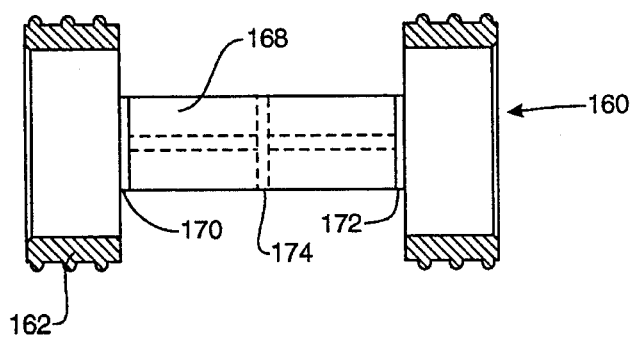

Referring now to FIGS. 4 and 5, there are illustrated an alternate embodiment of the duct coupler of the present invention. The alternate embodiment illustrated is oval in cross sectional configuration and is utilized in connection with oval prior art flexible duct. The identifying numerals used in connection with the FIGS. 4 and 5 embodiment correspond to the identifying numerals of corresponding parts of the FIGS. 1 through 3 embodiment, with the addition of a prefix numeral "1." Thus, the oval duct coupler of FIG. 4, designated as 110, corresponds in function to the cylindrical duct coupler 10 of FIG. 1, etc.

The oval duct coupler 110 is positioned in surrounding relationship to the adjacent ends of two sections of flexible oval duct 112 and 114. Only portions of the ducts near their adjacent ends are shown; the entire sections of ducts may be 20 feet or more in length. Each section of duct comprises a body 116, preferably formed of plastic or some other impermeable and relatively inert material. A plurality of increased dimension portions or protrusions extend above the outside diameter of the duct body 116. These comprises solid rectangular reinforcing ribs 118 and rounded annular ribs 120.

In surrounding relationship to the adjacent ends of the duct sections 112, 114 there is provided the duct coupler 110. It comprises a oval body 122, preferably formed of an impermeable, relatively inert and at least slightly flexible material, such as plastic, fiberglass or hard rubber. A longitudinal passageway (not illustrated) extends through the coupler body and is dimensioned to accommodate the two ends of the duct sections 112, 114. Opposite longitudinal ends of the coupler body are provided with a plurality of longitudinally extending cuts or serrations 124 to provide a plurality of cantilevered segments or teeth 126. The shank portion of each tooth, since it is formed integrally with the coupler body 122, permits limited outward flexibility of each tooth with respect to the longitudinal axis of the coupler 110 and ducts 112, 114. The teeth and shanks comprise flexible means for flexing outwardly to accommodate the passage of the annular ribs 120 therethrough and, when locked, for preventing longitudinal displacement of the duct sections. The end portion of each tooth, facing toward the duct sections 112, 114, is formed as an inclined surface to provide biasing means for urging the individual teeth radially outwardly to permit them to pass over the ribs 118, 120 on the exterior surface of the ducts.

The longitudinal passageway inside the oval duct body contains the same arrangement of channels with sloped inwardly facing sidewall portions, and sealing elements for sealing between the coupler body and the ducts as described above in connection with the cylindrical duct coupler 10.

As illustrated in FIGS. 4 and 5, there also is provided an alternate, unitary, embodiment of the locking means, adjusting means and retaining means described above in connection with the cylindrical duct body. In the alternate embodiment as illustrated, these means are provided by unitary locking structure 160 formed by casting or molding from a somewhat flexible material such as hard plastic, fiberglass or rubber. The apparatus comprises a pair of oval rings 162, 164 which are longitudinally adjustable on the outside of the duct coupler body 122. The rings 162, 164 comprise locking means for urging the outwardly flexed teeth 126 back toward the duct bodies and for preventing subsequent outward displacement of the teeth 126. The rings 162, 164 are slidable longitudinally at the coupler body between engaged and disengaged positions. The two rings 162, 164 are joined by means for adjusting the locking means between disengaged and engaged positions. Such adjusting means preferably comprise two sets of opposed hinges 164, 166 each comprising two hinge leafs 168, all of which preferably are formed integrally with the rings 162, 164 by casting or molding to provide a unitary structure. Interior notches 170, 172 formed at each end of the hinge pairs 164, 166 and central outside notches 174, formed between adjacent hinge leafs, provide the same function as hinge pins in the embodiment of FIGS. 1–3. As illustrated most clearly in FIG. 4, such notches allow the cast hinges to pivot outward, permitting the rings 162, 164 to move toward each other into a disengaged position. When the hinges are flattened, as illustrated in FIG. 5B, the notches also comprise retaining means for retaining the rings 162, 164 in the expanded, engaged position where they will lock the individual teeth 126 into position. The notches permit adjacent hinge leafs to be depressed into a configuration where the central portion of the hinges will be closer to the longitudinal axis of the duct coupler 110 than are the ends of the hinges attached to the rings 162, 164. When so positioned, any movement of the locking rings 162, 164 toward each other will tend to further depress the hinges until they contact the body 122 of the duct coupler, preventing further movement. The rings may be released simply by manually lifting the hinges at their central portions to permit them to open in the normal manner.

Rigidifying ribs 176, preferably also cast integrally with the hinge leafs, are provided for strengthening the hinges.

The unitary structure illustrated in FIGS. 4 and 5 for providing locking means, adjusting means and retaining means should be cheaper to manufacture than the corresponding structure of FIGS. 1 through 3. Since the hinges need to be operated only a few times in the course of assembly and locking the duct coupler, and since the locked structure parts will be held in place permanently by the hardened concrete, the potentially reduced hinge life provided by the structure FIGS. 4 and 5 should be of no consequence in the function of the device.

Although the unitary locking apparatus is illustrated in FIGS. 4 and 5 as being of oval configuration, it will be apparent to those skilled in the art that it made be in any shape, including a round configuration suitable for use with the cylindrical duct coupler of FIGS. 1 through 4.

The foregoing disclosure and description of the invention is illustrative only and various changes may be made in the size, shape and materials of construction, without departing from the spirit of the invention.

What is claimed is:

1. A coupler for joining and sealing between adjacent ends of two sections of duct of the type having an elongated duct body with a first outside dimension and at least one increased dimension portion with a second outside dimension, said coupler comprising:

a body having a longitudinal passageway therethrough, said passageway being sized to accommodate the first outside dimension portion of said duct sections;

flexible means at the two longitudinally spaced ends of said body for flexing outwardly sufficiently to accommodate the passage therethrough of said increased dimension portion of said duct sections;

a pair of locking rings disposed around the outside of said coupler body and slidable longitudinally thereof between engaged and disengaged positions;

hinge means interconnecting said locking rings for adjusting said locking rings between engaged and disengaged positions; and sealing means in said longitudinal passageway for sealing between said coupler and said duct sections, whereby, with said locking rings disengaged, said adjacent ends of said two duct sections can be inserted into opposed ends of said longitudinal passageway until the increased dimension portions of said duct sections have passed through said flexible means, and engaged said sealing means, after which said locking rings can be engaged, preventing said ends of said duct sections from being withdrawn from said duct coupler.

2. The apparatus according to claim 1 wherein said hinge means are so constructed that displacement of the center portion of said hinge means radially away from the longitudinal axis of said body will urge said locking rings to move towards disengaged positions and movement of said center portion of said hinge means radially towards said longitudinal axis of said body will urge said locking rings to move toward engaged positions.

3. The apparatus according to claim 1 wherein said hinge means are so configured that, with said locking rings in their engaged positions, movement of the center portion of said hinge means into contact with the outside surface of said body will cause said locking rings to be retained in their engaged positions.

4. The apparatus according to claim 1 wherein said hinge means and said locking rings are formed as a unitary structure.

5. The apparatus according to claim 1 wherein said flexible means comprise a plurality of flexible cantilevered teeth formed integrally with the body of said coupler.

6. The apparatus according to claim 1 comprising additionally a pair of longitudinally spaced channels formed at opposite ends of the passageway through said coupler body, said channels being dimensioned to accommodate said increased outside dimension portion of said duct sections.

7. The apparatus according to claim 1 comprising additionally biasing means for urging said flexible means of said coupler body outwardly, when engaged by said increased outside dimensions portion of said duct sections, to permit the passage of said increased outside dimension portions of said duct sections therethrough.

8. The apparatus according to claim 1 wherein said sealing means comprises a pair of o-rings adapted to be confined between said channels in said coupler body and said increased outside dimension portions of said duct sections when said flexible means are retained against outward movement by said locking means.

9. The apparatus according to claim 1 wherein said coupler body has a generally cylindrical configuration.

10. The apparatus according to claim 1 wherein said coupler body as a generally elongated oval configuration.

* * * * *